US006925962B2

(12) United States Patent  (10) Patent No.: US 6,925,962 B2
Moreau  (45) Date of Patent: Aug. 9, 2005

(54) ELEVATED BEAM COW STALL ASSEMBLY

(75) Inventor: Joseph R. Moreau, Clinton, NY (US)

(73) Assignee: Norbco, Inc., Westmoreland, NY (US)

( * ) Notice: Subject to any disclaimer, the term of this patent is extended or adjusted under 35 U.S.C. 154(b) by 12 days.

(21) Appl. No.: 10/666,874

(22) Filed: Sep. 19, 2003

(65) Prior Publication Data

US 2005/0072371 A1    Apr. 7, 2005

(51) Int. Cl.[7] .............................................. A01K 1/00
(52) U.S. Cl. ...................................... 119/516; 119/523
(58) Field of Search ....................... 119/516, 519–520, 119/523; D30/108, 114

(56) References Cited

U.S. PATENT DOCUMENTS

| | | | |
|---|---|---|---|
| 1,142,246 A | 6/1915 | Gagan | 119/27 |
| 2,642,037 A | 6/1953 | Merrill | 119/27 |
| 3,802,392 A * | 4/1974 | Andersen | 119/523 |
| 4,343,263 A | 8/1982 | Gloeggler | 119/27 |
| 4,350,117 A | 9/1982 | Hacker | 119/27 |
| 4,911,104 A | 3/1990 | Abel | 119/27 |
| 5,111,770 A | 5/1992 | Weelink | 119/27 |
| 6,026,766 A | 2/2000 | Albers, Jr. | 119/520 |
| 6,227,757 B1 * | 5/2001 | Delouvee et al. | 403/400 |
| 6,230,658 B1 | 5/2001 | Rudolph | 119/523 |
| 6,318,297 B1 | 11/2001 | Hatfield | 119/516 |
| 6,467,434 B1 * | 10/2002 | Dejonge et al. | 119/516 |

* cited by examiner

Primary Examiner—Teri Pham Luu
Assistant Examiner—Kimberly S. Smith
(74) Attorney, Agent, or Firm—Bernhard P. Molldrem, Jr.

(57) ABSTRACT

An elevated-beam cow stall assembly employs angle brackets each installed on a respective vertical post. Support stanchions formed of a vertical rail, with upper and receiver members affixed at upper and lower ends of the rail, are attached to the back plates of the angle brackets, and the back plates also support the horizontal support beam. Tubular stall dividers each have an upper and a lower horizontal rail, the ends of which are mounted into the receivers of the stanchions. Additional stanchions may be affixed, i.e., with U-bolts, at intermediate locations along the horizontal beam, and these stanchions also support associated stall dividers. Neck rails may be attached to the upper rails of the dividers, and brisket rails or brisket pipes may be supported on the lower rails of the dividers. This construction permits an unobstructed space below the horizontal beam to give the cow some freedom of movement for lying down and rising.

15 Claims, 7 Drawing Sheets

ELEVATED BEAM COW STALL ASSEMBLY

BACKGROUND OF THE INVENTION

This invention relates in general to the construction of animal stalls, in particular stalls for dairy animals, and is more particularly directed to an improved arrangement of stall dividers forming double rows of cow stalls, especially suited for freestall dairy barns. In particular, the invention is related to a system in which a number of cow stall dividers can be supported on a single transverse beam that is elevated above the floor of the stall.

Freestall dairy barns, also known as loose housing, have become an attractive option for dairy farmers who want to maintain and manage a large dairy herd. The advantages of the freestall housing system include reduction of bedding per cow, less space per cow, ease of manure removal, reduced udder washing time before milking, higher milk quality, and less frequent udder injury. The large cattle population housed within the barn, requires the design of the barn to pay attention to the areas where the cows rest, i.e., the free stalls.

As a matter of background, general guidelines for constructing and employing freestall barns for a dairy herd are found in Robert E. Graves, Guideline for Planning Dairy Freestall Barns, Northeast Regional Agricultural Engineering Service Cooperative Extension, Ithaca N.Y., 1995. Other useful background information can be found in Moeller et al., Free-Stall Loose Housing for Dairy Cattle, ID-63, Purdue University Cooperative Extension Service; Hammond, Dairy Free Stall Design, University of Georgia College of Agricultural and Environmental Services Cooperative Extension Service; and Chastain et al., Dairy Lighting System for Free Stall Barns and Milking Centers, Pub. AEU-12, University of Minnesota Extension Service, Department of Biosystems and Agricultural Engineering, August 1966.

A number of free stall designs have employed tubular, loop-like stall dividers to minimize the need for structural elements at the front and sides of the animals, to give the animal increased freedom of movement when standing or lying in the stall, and to facilitate rising from a lying position. On the one hand, conventional free stall designs have required a pair of vertically-spaced horizontal beams or similar support rails strung one above the other, and supported on the vertical posts, with the stall dividers being supported on the two horizontal beams. An example is described in Albers, Jr. U.S. Pat. No. 6,026,766. Another proposed free stall divider system is discussed in Rudolph U.S. Pat. No. 6,230,658 and another still is discussed in Hatfield U.S. Pat. No. 6,318,297. The stall systems described there do not employ a forward horizontal beam as a major support member, and thus require either a vertical post per each stall divider, or omission of the posts altogether.

An arrangement with one vertical post for each stall does provide an open front for the stalls, but this requires concrete supporting curbs, which are expensive to install.

It is advantageous to have an open area for the first thirty-six inches or so above the floor at the front of each cow stall to give the animal freedom of movement to assist her in lying and standing. It has been observed that structural elements that are much below about 36 inches over the floor can get in the way of natural motion of the cow. For example, when cows lie down and when they rise from a lying position, the cows will lunge forward somewhat. If there are obstructions present, a cow may injure her head or foreleg on them. Accordingly, there are advantages in overall cow comfort and safety if a lower support beam can be omitted. On the other hand, a horizontal rail or beam, placed above that level, could serve to support a number of stall dividers, providing economy of construction and sufficient strength to withstand the normal use expected by large animals. However, no suitable system of construction of a cow stall arrangement for a freestall barn has yet been proposed.

OBJECTS AND SUMMARY OF THE INVENTION

Accordingly, it is an object of this invention to provide a cow stall arrangement for a freestall dairy barn which overcomes the drawbacks of the prior art.

It is another object to provide a cow stall arrangement which can be easily field-installed.

It is a further object to provide a cow stall arrangement that employs only a single horizontal support beam at the front of the line of stalls, and which can support double ended dividers to create a double row of stalls.

It is another object to provide a cow stall arrangement that can be installed onto a series of vertical posts that are arranged in alignment with one another on the floor of a cow stall.

In accordance with an aspect of this invention, an elevated-beam cow stall assembly is erected on a series of posts, including at least a pair of vertical posts installed in a floor of a row of cow stalls. There are angle brackets each installed on a respective one of these posts. Each of these angle brackets each has a side plate mounted onto the associated post, and an apertured back plate. Support stanchions are provided, with each including a vertical rail or tube, an upper receiver affixed at an upper part of the vertical rail, and a lower receiver affixed at a lower part of the vertical rail. At the positions of the posts, respective ones of these support stanchions are mounted onto the back plate of the respective angle bracket. A horizontal beam or rail is affixed onto the back plates of these angle brackets and this rail extends transversely from post to post, and extends beyond the posts.

Tubular loop-type stall dividers, of the type having an upper horizontal rail and a lower horizontal rail, are mounted into these stanchions, with ends of the upper and lower rails being mounted in the receivers of the support stanchions. Additional stanchions may be affixed, i.e., with U-bolts, at intermediate locations along the horizontal beam, and these stanchions also support associated stall dividers.

Neck pipes or neck rails may be attached to the upper rails of the dividers, and brisket rails or brisket pipes may also be supported on the lower rails of the dividers, each extending in the transverse direction. These may provide some of the structural strength of the stall system.

In a preferred embodiment, the vertical stanchions each comprise a vertical rail or tube member, an upper receiver formed of a channel member affixed (i.e., welded) onto an upper end of the tube member and a lower receiver formed as a channel member and affixed onto a lower part of the vertical tube member. The channel type receivers project in two opposite directions, i.e., fore and aft, from the tube member such that a pair of facing stall dividers may be supported on each stanchion. In preferred embodiments, each channel member is oriented with a web thereof on an upward facing side, and an open side facing downwards.

Preferably, the angle brackets are each formed of a side plate and a back plate joined at a 90 degree angle. The side plate has at least a pair of bolt holes therethrough to receive mounting bolts for attaching the side plate to the post. The back plate has a first pair of bolt holes at its upper end to receive a U-bolt for attaching to the associated stanchion, a second pair of bolt holes at its lower end to receive a U-bolt for attaching to said stanchion, and three additional pairs of bolt holes each pair disposed at a spaced vertical position between said first and second pairs of bolt holes, for receiving U-bolts to attach to said horizontal beam. The three pairs of holes render the angle bracket symmetrical, permitting it to be used on either side of a given post. Preferably, the pair of bolt holes in the side plate are arranged one above the other. This angle bracket can be installed on posts of laminated construction, and the bolts pass through the laminates in the stack direction, so that the angle bracket and threaded fasteners tighten in the direction to strengthen the laminated posts.

The above and many other features, objects, and advantages of this invention will become apparent from the ensuing description of a preferred embodiment, which is to be read in connection with the accompanying Drawing.

DETAILED DESCRIPTION OF A PREFERRED EMBODIMENT

Figure 1:
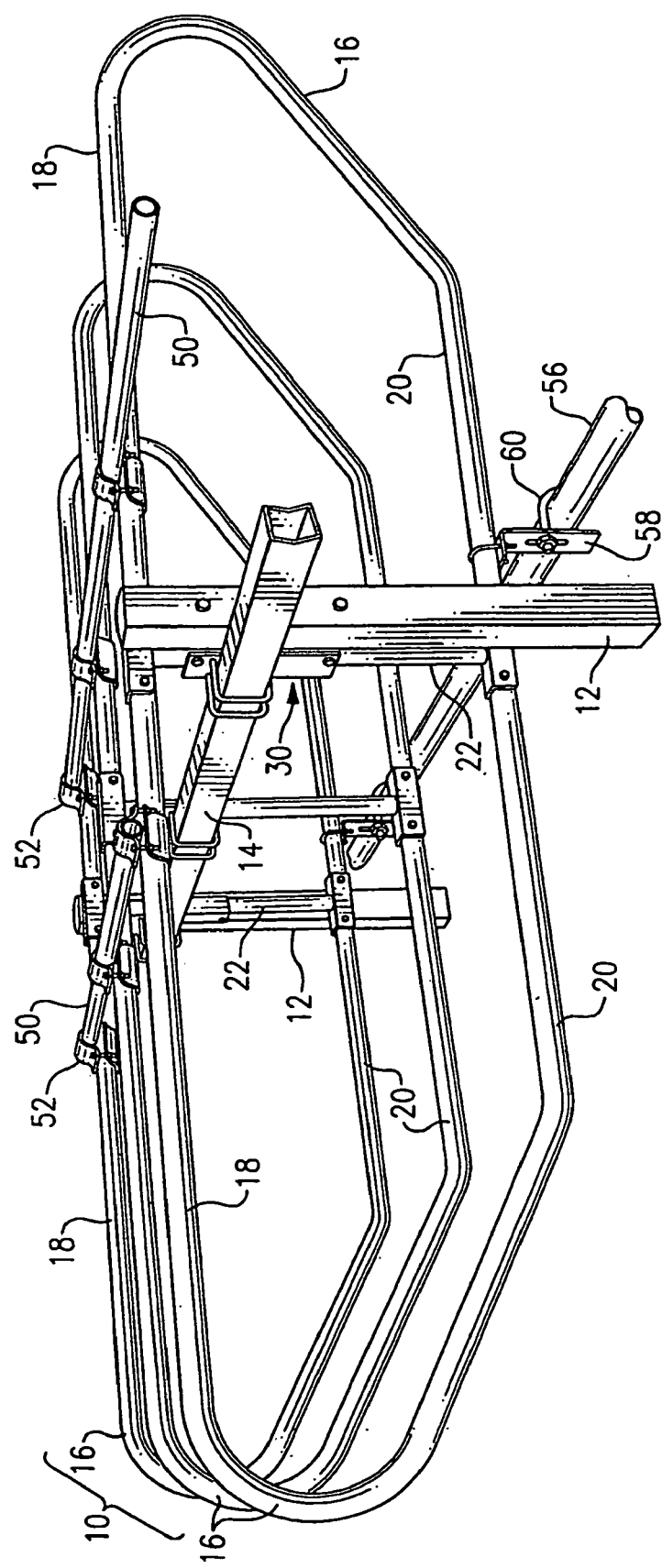
FIG. 1 is a perspective view of a portion of the cow stall assembly according to one embodiment of this invention.
Figure 2:
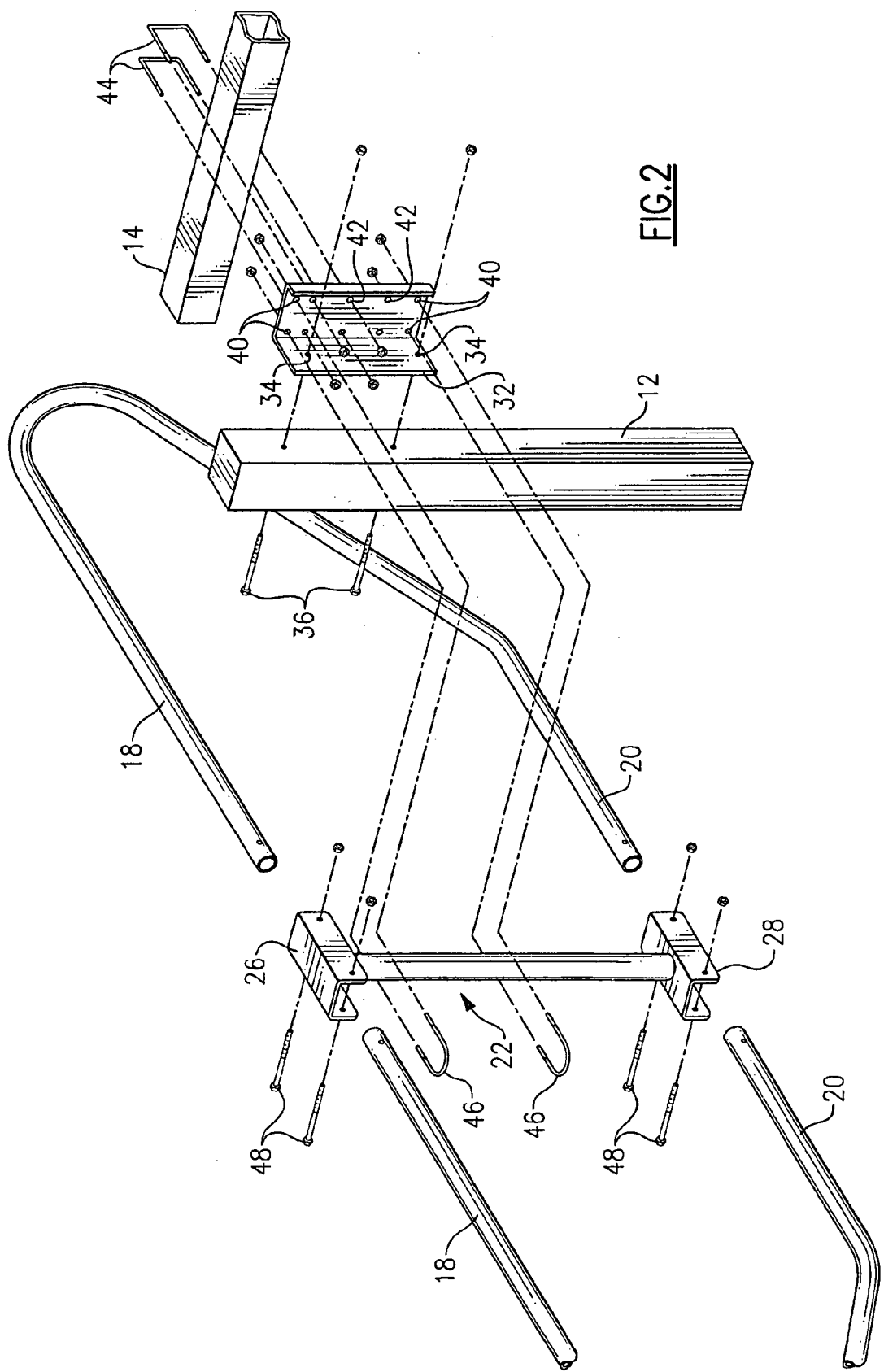
FIG. 2 is an assembly view of a portion of the cow stall assembly of this embodiment.
Figure 3:
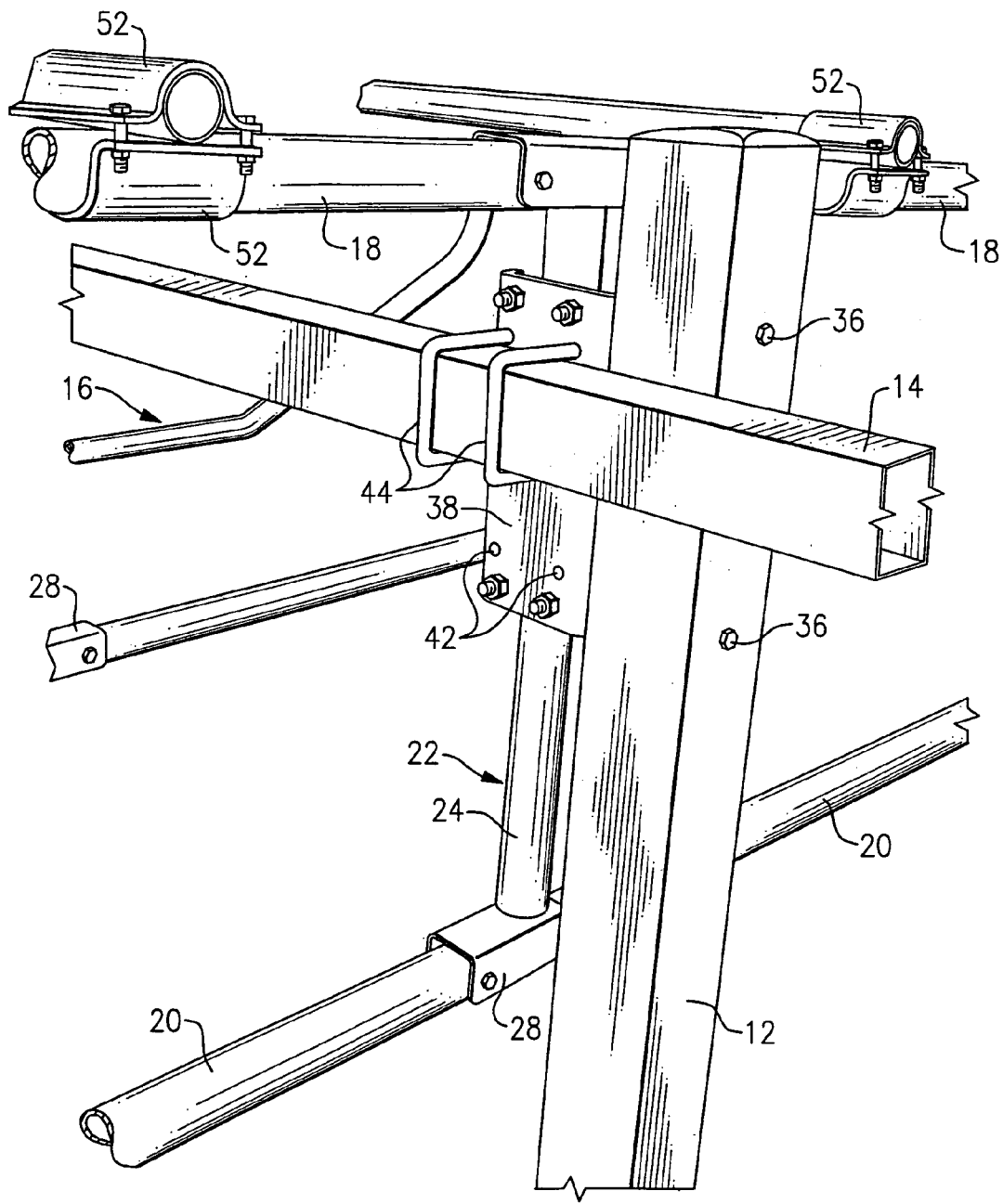
FIG. 3 is a detail perspective of a portion of this embodiment.
Figure 4:
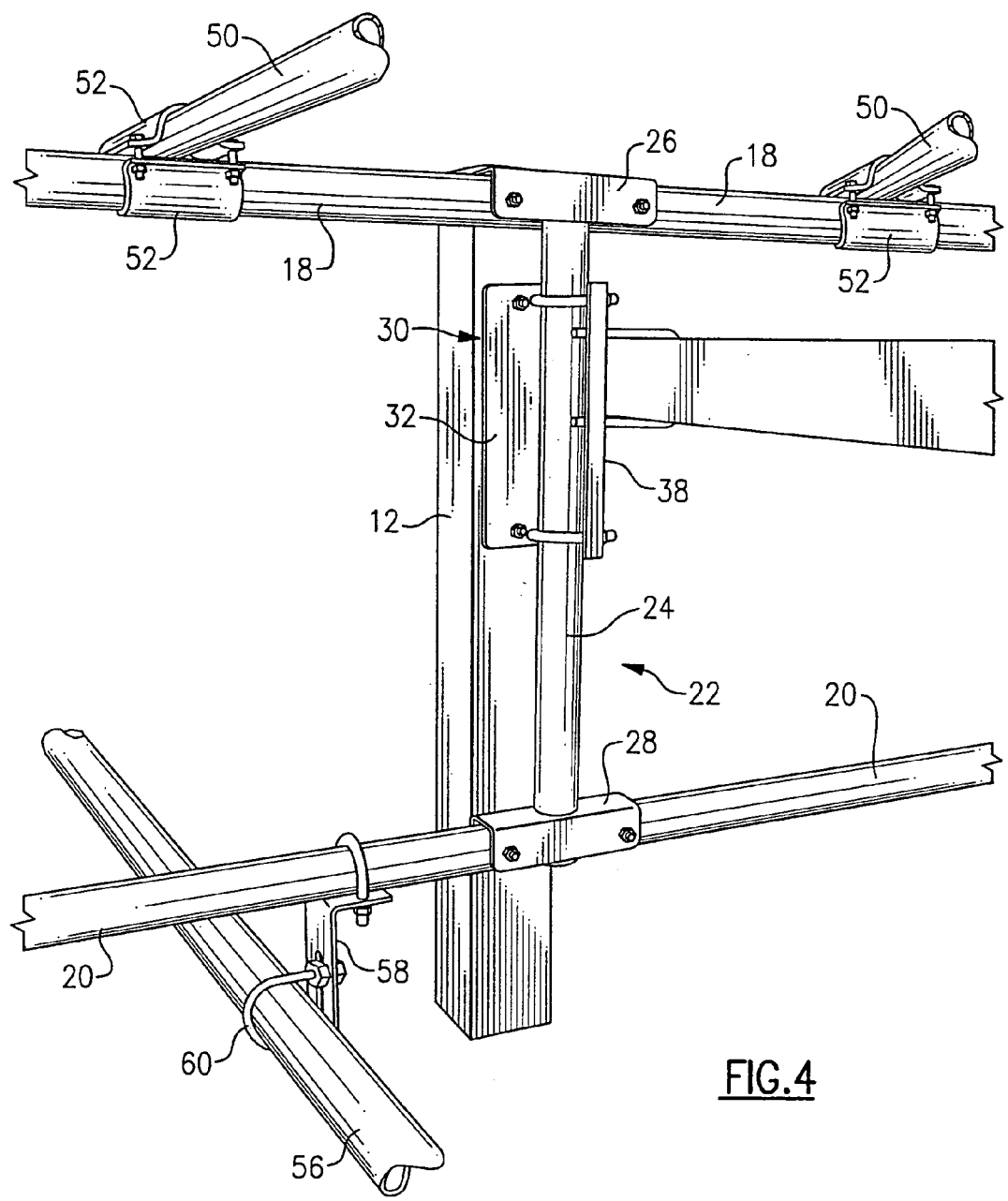
FIG. 4 is a detail perspective of another portion of this embodiment.

With reference to the Drawing, FIG. 1, with additional reference to FIGS. 2, 3, and 4, shows salient details of a freestall double-row cow stall assembly 10. A number of vertical posts 12 are mounted in the floor of the cow stall, and may, e.g., be steel or wood columns, and may favorably be of a laminate wood construction. The floor may be concrete, earth, sand, or other material, and the posts 12 may be planted in the floor, or may be suspended from above. The posts 12 are aligned with one another right to left, and define a center line between two facing rows of stalls. A support beam 14 extends the length of the cow stall assembly, and while not shown here, there may be means for joining sections of the beam end-to-end to one another. The horizontal support beam 14 is mounted onto the posts 12, at a position about thirty-six to thirty-nine inches above the floor. Here, a single support beam 14 is used, which provides an unobstructed space beneath the beam 14 to make it easier for a cow in the stall to rise up to her feet from a resting position. However, the beam 14 is still low enough to prevent or discourage the cow from walking through the front end of the stall into the facing stall row.

Here, the stalls are defined by a series of stall dividers 16, and in this embodiment the dividers 16 are tubular loop-type dividers, with a single tubular rail bent into a loop having a generally horizontal upper rail 18 and a generally horizontal lower rail 20. The stall dividers can be of other shapes and dimensions, and may use rails of round, square or other cross section.

Support stanchions 22 are provided to attach the stall dividers 16 onto the horizontal beam 14, with one support stanchion 22 being provided for each facing pair of stall dividers 16. Each stanchion 22 has a vertical tube or rail 24 with an upper receiver 26 affixed at the top end of the rail 24, and a lower receiver 28 at the bottom portion of the vertical rail 24. In this embodiment, the two receivers 26 and 28 are channel members that are welded onto the tubular rail 24. Here, the channels are oriented with their webs at the top, an open side facing downwards, and the flanges to the sides. In other embodiments, the receivers 26 and 28 could be tubular sleeves, or members of a variety of other shapes. Also, the vertical rail 24 can be of round cross section, as shown here, or may have a profile that is square or another shape.

Angle brackets 30 are employed to attach the horizontal beam 14 to the posts 12. In addition, each angle bracket 30 also directly supports one of the stanchions 22. Each angle bracket 30 has a side plate 32 that mounts against one side of the associated post 12. The side plate 32 has upper and lower bolt holes 34, 34 that receive bolts 36 or other suitable fasteners that penetrate through the post 12. The bolts 36 pass through the transverse direction of the post 12, and when laminated posts are used, this corresponds to the stack direction, so that the bolts pass through the laminations, rather than cutting between them. Thus, in such case the bolts and side plate tend to compress the laminations together and strengthen the post structure.

An apertured back plate 38 is joined at a right angle to the side plate of the angle bracket 30. Here, the back plate 38 has pairs of bolt holes 40 adjacent its top and bottom edges, respectively, and three additional pairs of bolt holes 42 at spaced levels between the first-mentioned pairs of bolt holes. A pair of square-end U-bolts 44 are positioned over the beam 14 and fit into respective ones of two of the pairs of bolt holes 42 to clamp the beam 14 securely in place. A pair of round-end U-bolts 46 fit over the tubular rail 24 of one of the stanchions 22, and fit through the upper and lower pairs of bolt holes 40, respectively, to clamp the stanchion in place onto the angle bracket. The stanchion receivers 26 and 28 may both have their open sides facing the same direction, or may have them in opposite directions, i.e., one upwards and the other downwards. In such case, where the stanchion is symmetrical, the stanchions can be installed either end up, which facilitates installation.

The ends of the upper and lower rails 18, 20 of the dividers fit into the upper and lower receivers 26, 28, and are retained by means of bolts 48 that pass through openings in the receivers and corresponding openings in the rails, as shown.

Neck rails 50, here in the form of tubes or pipes, are attached onto the upper rails 18 of the stall dividers, and extend horizontally and transversely, i.e., parallel to the support beam 14. These are secured by mating pairs of omega clamps 52, with one omega clamp placed beneath the upper rail 18 of each divider and another omega clamp placed above the neck rail 50. Neck rails 50 are situated in corresponding positions on both rows of the double-row cow stall arrangement. The neck rails 50 serve to help position the cow when standing, and also furnish additional structural strength to the cow stall assembly.

A brisket rail 56 is also shown here attached onto the bottom rails 20 of the stall dividers. In this embodiment, the brisket rail 56 is favorably formed as a polyethylene plastic pipe, with a nominal diameter of five inches. There are L-shaped hangers 58 fitted onto each of the bottom rails 20 and each has a J-bolt 60 that secures over the pipe or rail 56. There may be a vertical slot in the hanger 58 to permit vertical adjustment of the positioning of the rail 56. The rail 56 is positioned near the floor as a mild restraint to the cow, but will permit the cow to step over when she lunges as she rises from a lying position. The plastic rail 56 has good linear rigidity, and provides some additional structural support for the dividers 12, but is yielding enough that is does not injure the cow's forelegs when she steps against it or kicks it.

For reasons of avoiding drawing clutter only a single brisket rail 56 is shown here. In practice there would be a brisket rail installed on each row of cow stalls. Also, a different means of attachment or installation of the brisket rail could be used, or a flat brisket board could be used instead of a tubular rail. Also, the brisket rail could be attached directly to the floor, rather than being suspended from the divider lower rails.

Figure 5:
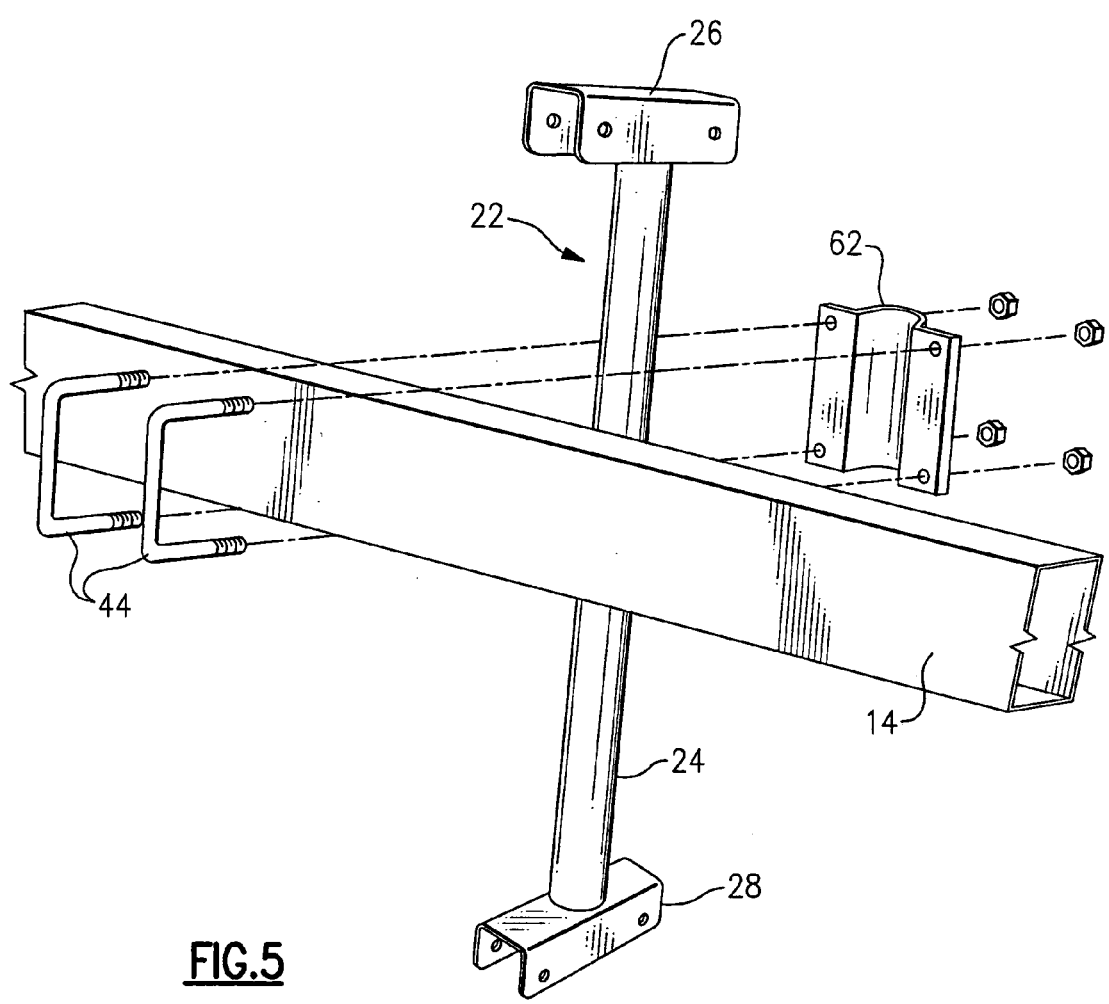
FIGS. 5 and 5A are assembly views of a portion of this embodiment.

As illustrated in FIG. 5, additional or intermediate stall dividers are attached onto stanchions 22 that are supported directly on the main support beam 14 at positions between the posts 12. Here, the stanchions can be identical with the ones illustrated and described earlier. For each stanchion 22 there is a pair of square-end U-bolts 44, 44 passing over the beam 14, and an omega clamp 62 holding the tubular vertical rail 24 of the stanchion against the beam 14, with the omega clamp 62 being held by the two U-bolts 44, 44. The upper and lower rails of each divider would be fitted into the upper and lower receiver, respectively, of the associated stanchion.

Figure 5A:
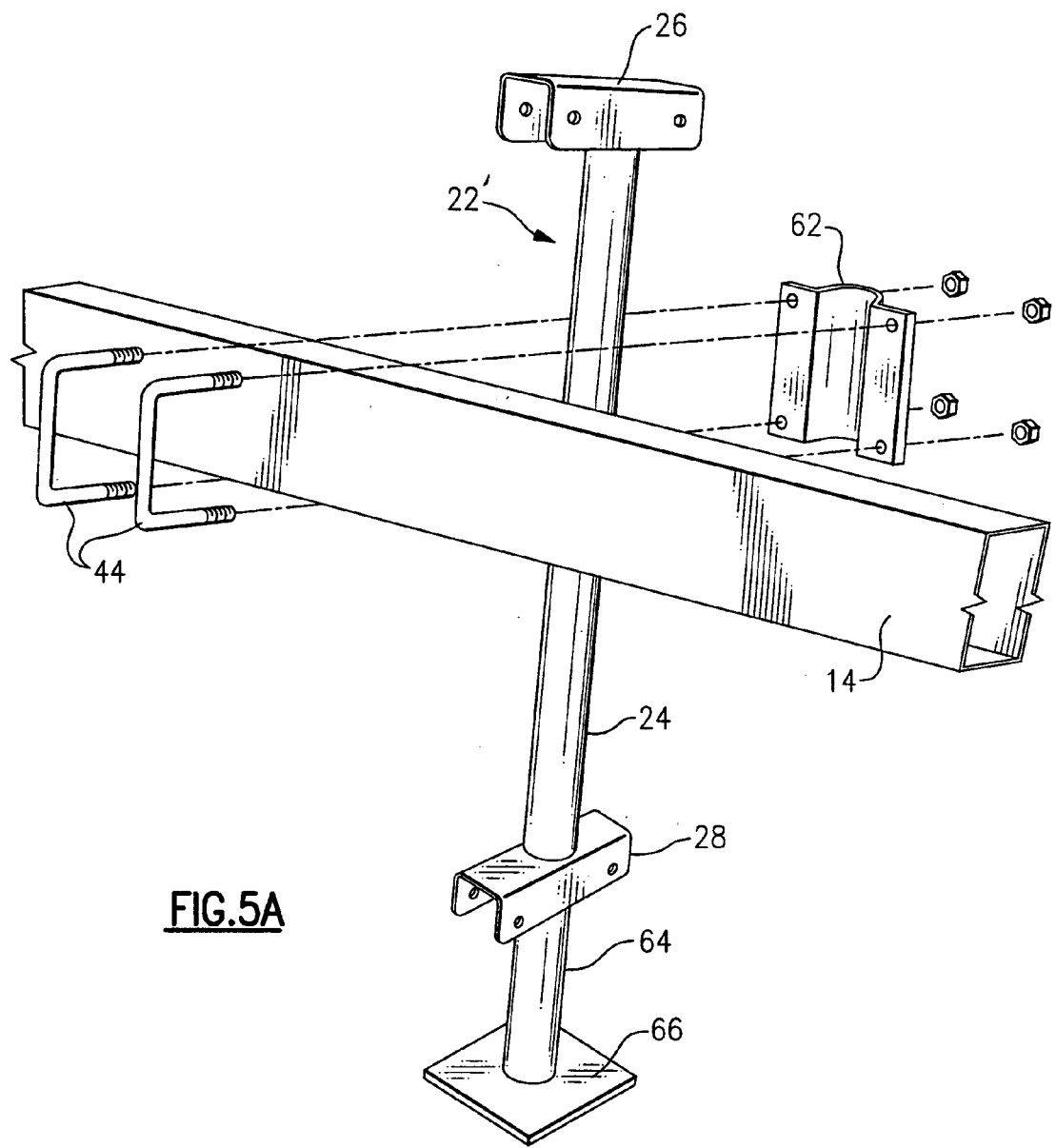

An alternative design of the stanchion 22' can include the structure that is shown in FIG. 5A, namely, a downward extension 64 of the tubular rail 24, extending below the lower receiver 28, and terminating in a footing plate 66. The stanchions with this additional footing can be used at some intermediate positions where there is a long space between successive posts 12, e.g., distances exceeding about twelve feet. The remaining portions of the stanchion 22' can be the same as in the stanchion 22 of FIG. 5.

Figure 6:
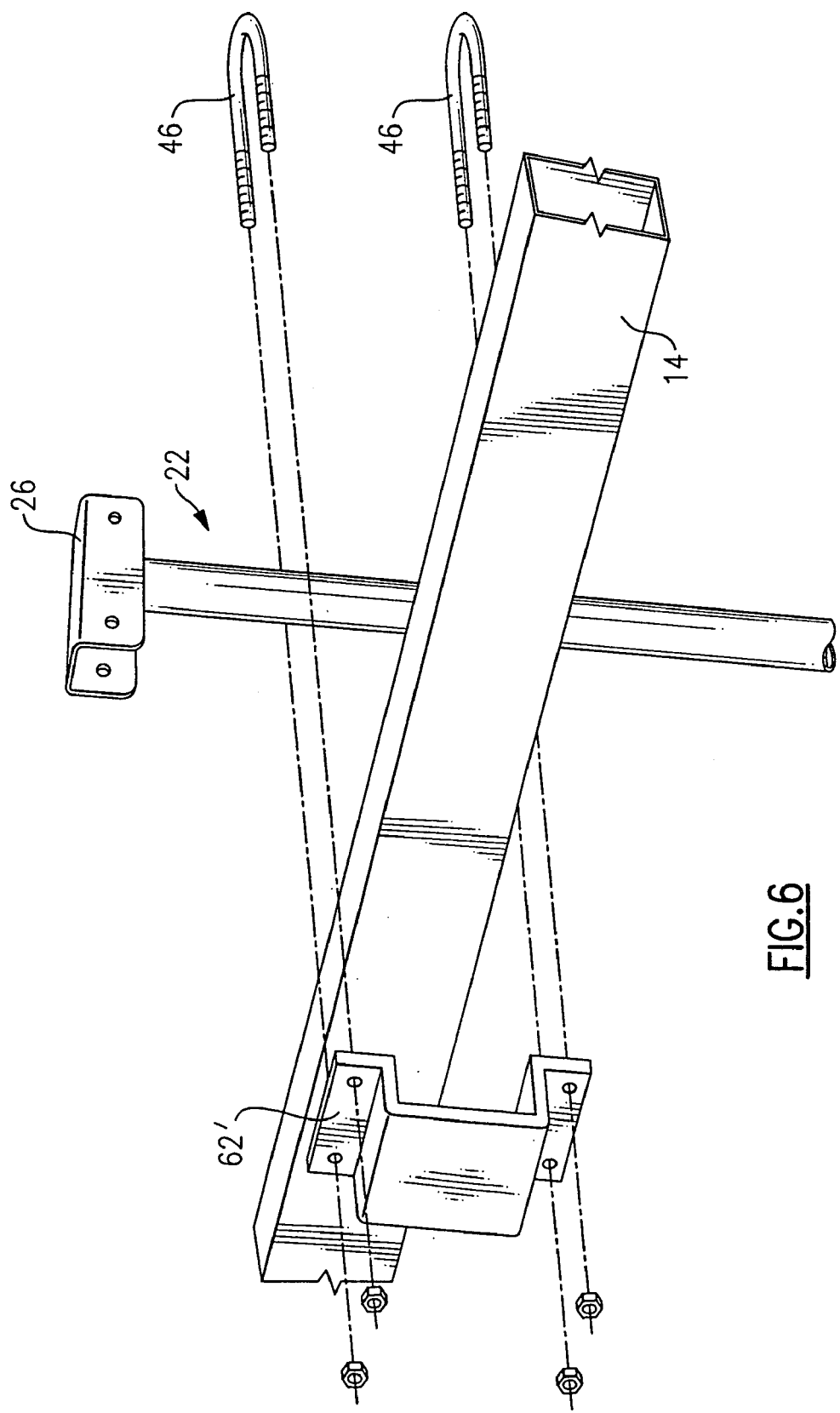
FIG. 6 shows an alternative arrangement of a portion of the embodiment.

Instead of the square-end U-bolts 44, 44, the stanchions 22 can be held with round-end U-bolts 46, 46, with a square omega clamp 62' fitting over the beam 14 and receiving the threaded ends of the U-bolts, as shown in FIG. 6. Other fastening arrangements could be used instead to mount the stanchions 22 to the support beam 14, as the costs of parts and labor may dictate. It is also possible that the tubular rails 24 of the stanchions 22 could be welded to the support beam 14, or bolted directly to the support beam.

In the cow stall arrangement of this invention, the beam 14 is positioned at about the same distance above the floor as the bend or nose at the front of the cow stall divider 16, where the animal makes contact when entering or leaving the stall. This places the beam 14 at the optimum position for absorbing any torsional forces from the cow pushing against the stall, and minimizes strain on the stanchions and other structural elements.

Here, the beam 14 is a four-inch square beam, but in other arrangements the beam could be a rail of another type or shape, e.g., an I-beam or a tubular round profile beam. The beam 14 must be capable of supporting the stall dividers.

In steel barn construction, the main vertical posts may be square, round, rectangular, or I-beams. The angle brackets may be attached to the steel posts as determined to be suitable by the installer so as to be compatible to the main building columns.

The stall widths may be set at the appropriate width, depending on the size of the cows in the dairy herd. The heights of the stall dividers can also be set and adjusted at an appropriate level without having to adjust the elevation of the horizontal beam 14. Different shapes of dividers can be used also, without departing from the main principles of this invention. Here, the receivers 26, 28 of the stanchions are channel members, but in principle these receivers could be tubular members or members of other shapes or profiles.

Likewise, a single row system could be installed according to the principles of this invention, with the stall dividers 16 placed only on the one side of the beam 14.

While the freestall cow stall arrangement of this invention has been described with specific reference to a preferred embodiment, it should be understood that the invention is not limited to that precise embodiment. Rather, many modifications and variations would present themselves to persons skilled in the art without departing from the scope and spirit of this invention, as defined in the appended claims.

I claim:

1. Freestall elevated beam cow stall assembly, comprising
   at least a pair of vertical posts aligned in respect to a floor of a row of cow stalls;
   first and second angle brackets each including a side plate mounted onto a respective one of said posts, and an apertured back plate;
   a plurality of support stanchions each including a vertical rail, an upper receiver affixed at an upper part of the vertical rail, and a lower receiver affixed at a lower part of the vertical rail;
   a first one of said support stanchions being mounted onto the back plate of said first angle bracket and a second one of said support stanchions being mounted onto the back plate of said second angle bracket;
   a horizontal beam affixed onto the back plates of said angle brackets and extending transversely between said posts; and
   at least first and second stall dividers each having an upper horizontal rail and a lower horizontal rail, with ends of the upper and lower rails being mounted in the receivers of said first and second support stanchions, respectively.

2. Freestall elevated beam cow stall assembly according to claim 1 wherein each of said first and second stanchions is mounted by a pair of round U-bolts passing over its vertical rail and through apertures in said back plate.

3. Freestall elevated beam cow stall assembly according to claim 1 wherein said beam is supported on the back plates of said angle brackets by a pair of U-bolts passing through apertures therein.

4. Freestall elevated beam cow stall assembly according to claim 1 wherein said beam is supported at substantially 36 to 39 inches above said floor.

5. Freestall elevated beam cow stall assembly according to claim 4 wherein an unobstructed space is provided between said beam and said floor.

6. Freestall elevated beam cow stall assembly according to claim 1 wherein at least one additional one of said stanchions is supported on said beam at a position between said posts, and at least one additional divider has ends of its upper and lower rails mounted in the upper and lower receivers of the additional stanchion.

7. Freestall elevated beam cow stall assembly according to claim 6, wherein said additional stanchion is mounted by means of a pair of U-bolts passing over said horizontal beam and into clamp means positioned on the vertical rail of said additional stanchion.

8. Freestall elevated beam cow stall assembly according to claim 7 wherein said clamp means comprises an omega clamp positioned on said vertical rail and receiving threaded ends of said U-bolts.

9. Freestall elevated beam cow stall assembly according to claim 6, wherein said additional stanchion is mounted by means of a pair of U-bolts passing over the vertical rail of said additional stanchion and into clamp means positioned on said horizontal beam.

10. Freestall elevated beam cow stall assembly according to claim 9 wherein said clamp means comprises an omega clamp positioned on said horizontal beam and receiving threaded ends of said U-bolts.

11. Freestall elevated beam cow stall assembly according to claim 1 wherein the receivers on each said stanchion include channel members into which the ends of the respective upper and lower rail end are received.

12. Freestall elevated beam cow stall assembly according to claim 1 wherein the receivers of said stanchions are double-ended and are adapted to receive rail ends of a pair of dividers that project in opposite directions with respect to said beam.

13. Freestall elevated beam cow stall assembly according to claim 1 wherein the side plate and the back plate of each said angle bracket are joined at a right angle.

14. Freestall elevated beam cow stall assembly according to claim 1 further comprising a neck rail traversing the upper rails of said dividers and affixed onto each of the upper rails at positions spaced from the associated stanchions.

15. Freestall elevated beam cow stall assembly according to claim 1 further comprising a brisket rail traversing the lower rails of said dividers at a position below the lower rails and spaced from the associated stanchion.

* * * * *